Patented Aug. 19, 1930

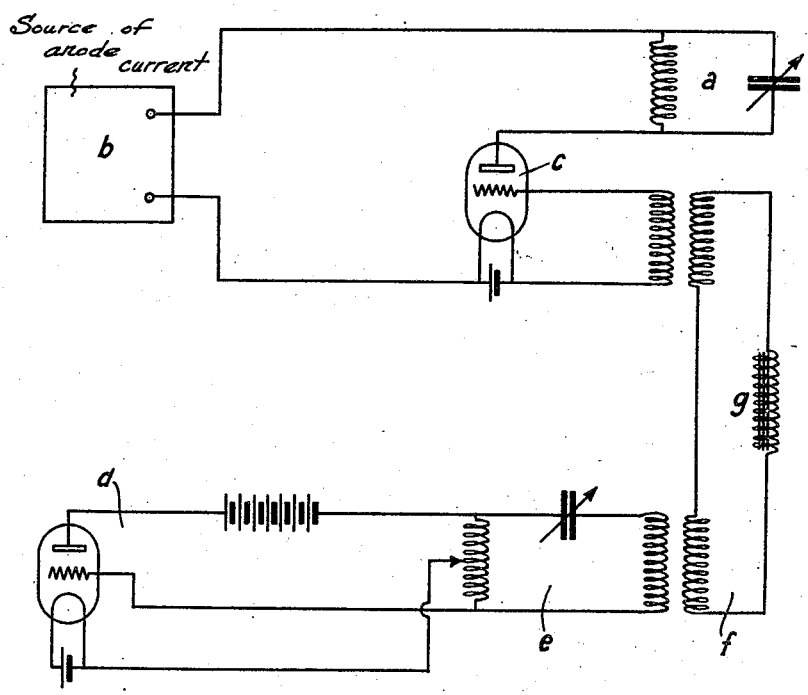

1,773,556

UNITED STATES PATENT OFFICE

GEORG von ARCO, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

OSCILLATION GENERATION

Application filed July 22, 1925, Serial No. 45,162, and in Germany July 25, 1924.

The invention relates to oscillation generation and more particularly to an arrangement for generating electrical waves or oscillations by means of an electron tube which cooperates with an oscillatory circuit as an interrupter to produce impact excitation of the oscillatory circuit.

The arrangement to some extent resembles a separately excited tube transmitter in which the tube is inserted between a charging source and the oscillatory circuit, while being controlled at the grid by high frequency exciter energy. However, while in the separately excited tube transmitter the anode oscillation circuit of the excited tube invariably has a natural frequency which is equal to that of the frequency of the controlling tube, it is to be noted that in the present invention the tube interrupter excites at a frequency which is a sub-multiple of the natural frequency of the anode oscillation circuit. The arrangement therefore allows of a raising of the exciter frequency for the purpose of generating waves of particularly high frequency.

In the diagram of connections shown in the accompanying drawing, by way of example, $a$ is the oscillatory circuit which is fed by a source of energy from the terminals $b$. In the lead to the oscillation circuit is inserted the interrupter tube $c$ which in turn is controlled at the grid by a suitable high frequency source. For this object there may be used a vacuum tube oscillator or exciter.

The oscillation circuit $e$ of this exciter is coupled with the grid circuit of the tube $c$ by means of an intermediate circuit $f$. This latter circuit contains a saturable iron cored coil $g$, the action of which is to distort or give peaks to the current produced by the exciter. Conditions may be suitably chosen so as to give a desired disymmetry to the controlling current. Direct current saturation may or may not be employed.

As already pointed out, in this arrangement the ratio of the oscillation circuit frequency to the exciter frequency is a relatively small whole number, in other words, the exciting frequency is only a submultiple of the natural period of the oscillation circuit $a$, that is, for instance ½, ⅓, ¼, etc., of the frequency of this circuit. Moreover, the voltage or current curve of the tube exciter after distortion is so chosen that the time during which the interrupter tube is conductive, lasts only about so long until the high frequency circuit has passed through ¼ of its oscillation phase, for otherwise the free oscillation of the oscillatory circuit $a$ at its own natural frequency would be interfered with. The reason the conductivity of the interrupter tube is spoken of is that ordinarily the tube would not be worked symmetrically as a straight amplifier tube, but rather asymmetrically, so that its practically uni-directional pulses will have more nearly an interrupter effect.

The exciting voltage, as will be seen, must rise rather rapidly, thereupon preserving its crest value for a short while, and finally preserves a very low value for at least three times as long a time. The working circuit, as a consequence, receives the charge impulse during the first quarter of its oscillation phase, while it dies out during the remainder of its period without resupply of energy.

In order to obtain the desirable marked dissymmetry of the exciter current one of several well known methods may be resorted to, for instance, by the formation of the exciting oscillatory circuit with an iron cored coil like $g$. Such iron core coils may be used with or without auxiliary magnetization.

It is important to note that the efficiency of the exciting circuit and of the exciting tube need not be high, but on the contrary may be greatly reduced for but smaller power is there required. What is of greater importance, however, is that the efficiency of the interrupter tube be high.

Having described my invention, I claim:

1. In combination, an oscillation circuit tuned to a relatively high frequency, a source of energy and the anode-cathode circuit of a three element electron discharge device connected in series with each other and coupled to said tuned circuit, a source of sharply peaked, relatively slowly alternating energy coupled to the control electrode-cathode circuit of said device, whereby said oscillation circuit is periodically charged to cause it to oscillate at its natural period.

2. The combination with an electron tube having a control circuit and an oscillatory output circuit tuned to a desired frequency, of means to apply to said control circuit periodic pulses of energy which are short relative to the direction of sine wave pulses at a lower frequency related to the desired frequency by a simple whole number.

3. An impulse generator of high frequency energy comprising a source of control energy of relatively low frequency, means to distort the wave form of this energy, an oscillation circuit tuned to the desired high frequency, a source of energy and an interrupter coupled to the oscillation circuit, and means to apply the distorted control energy to the interrupter in order to supply charge impulses to the oscillation circuit.

4. An impulse generator of high frequency energy comprising a source of control energy of relatively low frequency, means to distort the wave form of this energy, an oscillation circuit tuned to the desired high frequency, a source of energy and an interrupter comprising a three electrode vacuum tube the output circuit of which is coupled to the oscillation circuit, and means to apply the distorted control energy to the control electrode of the interrupter tube in order to supply charge impulses to the oscillation circuit.

5. An impulse generator of high frequency energy comprising a source of control energy of relatively low frequency, means including a saturable iron cored inductance to distort the wave form of this energy, an oscillation circuit tuned to the desired high frequency, a source of energy and an interrupter coupled to the oscillation circuit, and means to apply the distorted control energy to the interrupter in order to supply charge impulses to the oscillation circuit.

6. An impulse generator of high frequency energy comprising a three electrode electron tube oscillator as a source of control energy of relatively low frequency, means including a saturable iron cored inductance to distort the wave form of this energy, an oscillation circuit tuned to the desired high frequency, a source of energy and an interrupter comprising a three electrode vacuum tube the output circuit of which is coupled to the oscillation circuit, and means to apply the distorted control energy to the control electrode of the interrupter tube in order to supply charge impulses to the oscillation circuit.

GEORG von ARCO.